United States Patent [19]
Del Pico

[11] 3,847,804
[45] Nov. 12, 1974

[54] PROCESS OF TREATING WOOL-SCOURING LIQUOR AND CENTRIFUGE EFFLUENT

[75] Inventor: Joseph Del Pico, Brockton, Mass.

[73] Assignee: Abcor, Inc., Cambridge, Mass.

[22] Filed: Feb. 20, 1973

[21] Appl. No.: 333,808

[52] U.S. Cl.................. 210/23, 210/321, 260/412.5
[51] Int. Cl........................................... B01d 13/00
[58] Field of Search ........... 210/23, 500; 260/412.5, 260/420

[56] References Cited
UNITED STATES PATENTS

| | | | |
|---|---|---|---|
| 2,692,184 | 10/1954 | Cabot & Cohen............... | 260/412.5 |
| 548,942 | 10/1895 | Wingfield......................... | 260/412.5 |
| 271,192 | 1/1883 | Braun & Liebreich........... | 260/412.5 |
| 2,629,723 | 2/1953 | Lundgren et al. ............... | 260/412.5 |
| 3,458,543 | 7/1969 | Koubik et al. .................. | 260/412.5 |

FOREIGN PATENTS OR APPLICATIONS

| | | | |
|---|---|---|---|
| 172,012 | 2/1923 | Great Britain...................... | 210/500 |

OTHER PUBLICATIONS

Michaels, A. S. "New Separation Techniques for the CPI" Chemical Engineering Progress, December 1968, pp. 31-43.

*Primary Examiner*—Charles N. Hart
*Assistant Examiner*—Ferris H. Lander
*Attorney, Agent, or Firm*—Richard P. Crowley

[57] ABSTRACT

A process of treating wool-scouring liquor and wool-scouring liquor centrifuge effluent, both containing wool-grease emulsion, by the utilization of membranes to concentrate the liquor before centrifuging, or to eliminate the centrifuging step by concentrating the wool grease in the scouring liquor to a concentrate level through the use of ultrafiltration membranes. The process permits the efficient and economic recovery of the wool grease from the membrane concentrate fraction, and provides for reuse or disposal of the aqueous-permeate fraction.

16 Claims, 3 Drawing Figures

PROCESS OF TREATING WOOL-SCOURING LIQUOR AND CENTRIFUGE EFFLUENT

BACKGROUND OF THE INVENTION

Raw wool is typically treated by employing a process referred to as emulsion-scouring to wash the wool. In the emulsion-scouring process, the raw wool is passed through a series of scouring tanks, whereby the impurities present in the wool, such as suint, dung, earth, sand and wool grease, are removed from the wool. Wool grease removal is specifically achieved in a tank containing a surfactant solution (nonionic or anionic surfactant). During and after the scouring treatment, the various impurity components are separated for disposal or recovery, depending on their economic value. Typically, the spent surfactant solution contains emulsified wool grease rich in lanolin and having a high economic value. Further, the removal of this wool grease from the spent scouring liquor is desirable in that it reduces the pollution load on the waterways into which it is typically discharged. Thus, in the emulsion-scouring process, wool is introduced into a cold-water bath so as to remove water-soluble impurities initially present in the fleece (referred to as suint), and, thereafter, introduced into a hot-water surfactant-containing bath for wool grease removal. The clean wool in this fashion results in a spent emulsified wool-grease solution typically containing from about 1 to 8 percent wool grease.

Although the wool grease in the emulsion-scouring liquor has a high economic value, the cost of recovering the wool grease is often quite high for small companies that do not have the capital assets, and, accordingly, such companies lagoon the emulsion-scouring liquor to provide for its disposal by biodegradation. Others employ one or both of the two main methods now available for recovering wool grease from aqueous-scouring liquors. These methods are the centifugal process and the acid-cracking process, or combinations thereof.

In the centrifugal process, the emulsion-scouring liquor is passed through one or more primary desludge separators, followed by a desludging centrifuge. The three component streams removed from the desludging centrifuge are a wool-grease concentrate stream, a partially degreased emulsion-scouring liquor stream, and, thirdly, a dirt-rich sludge. The dirt sludge is often discharged to drain or filter-pressed to concentrate the disposal of the sludge. The centrifugal recovery process provides for recovery of only up to about 50 percent by weight of the wool grease, but typically, 25 to 40 percent of the grease. The wool-grease concentrate stream is rich in lanolin which is a valuable product useful in the soap, cosmetic and other industries. A series of centrifuge separators may be employed to compound recovery percentages if desired. If desired, the partially degreased liquor stream exiting the centrifuge may be disposed of or treated by the acid-cracking process to recover additional wool grease. However, the additional grease recovered is a low-quality grease not suitable for lanolin recovery. Recovery of the grease is for pollution-abatement purposes, and not for economic advantages. The centrifugal process, although simple, does not provide for very high overall economic recovery of the total wool grease.

Another method of wool-grease recovery from emulsion-scouring liquors is known as the acid-cracking process. In the acid-cracking process, the emulsion-scouring liquor again is initially desludged by a primary desludger. The liquor is then acidified with an acid to a pH between about 2 and 4, to provide for acid-cracking or destabilization of the wool-grease emulsion. The acid-cracked liquor is then collected in a settling tank where a major portion of the wool grease and dirt are separated as a sludge, with the wool grease accumulating with the dirt particles on the bottom of the settling tank. The sludge recovered is then treated to recover the valuable wool grease, such as by filter-pressing the sludge. Generally, the recovery yield of the wool grease using the acid-cracking process is about 65 percent by weight, with losses occurring in the unsettled supernatant and filter cake.

In the centrifugal recovery process discussed earlier, the partially degreased liquor is often treated by the acid-cracking process to achieve additional wool grease, but usually, to provide for a cleaner plant aqueous-effluent stream. One disadvantage of the acid-cracking process is that the lanolin is composed of a mixture of alcohol, acid and ester compounds. Acid treatment hydrolyzes the ester and produces acid and alcohol components, which are often not desirable and are of lower economic value.

In summary, the centrifugal process employed for the recovery of wool grease or an aqueous-scouring liquor is characterized by an unsatisfactory level of wool-grease recovery and the need to treat further the partially degreased liquor prior to discharge as an effluent, while the acid-cracking process, although providing for higher recovery levels of wool grease, has the inherent disadvantage of producing a low-quality grease unsuitable for lanolin recovery.

SUMMARY OF THE INVENTION

My invention concerns the employment of a membrane device in a wool-scouring process to provide for the economic and efficient recovery of wool grease, and for the generation of a nonpollutant aqueous-effluent stream. In particular, my invention relates to the employment of an ultrafiltration low-pressure membrane unit in either or both of a centrifugal or an acid-cracking wool-recovering process to permit the more rapid, efficient and economic recovery of the valuable wool grease, thereby permitting the wool-scouring process industry to achieve substantial economic advantages due to the greater recovery of wool grease as a valuable by-product, with the further advantage of having reduced processing equipment, operation and material costs as a result of the reuse of the membrane permeate recycled back to the scouring process operation, while simultaneously achieving abatement of pollution through the reduction of pollutants in the effluent streams from the operations.

In my process, a membrane device, particularly an ultrafiltration membrane unit, containing a semipermeable membrane, is employed to separate the emulsion-scouring liquor into an aqueous effluent and an emulsion concentrate. In my process, one or more membrane units, particularly ultrafiltration membrane units, are employed, which membrane units operate at a pressure of from about 10 psig to 200 psig; for example, 40 to 100 psig. The membrane unit includes a semipermeable membrane adapted to separate the emulsion-scouring liquor as desired, and typically, may comprise any polymeric material which permits the passage of water and dissolved low-molecular weight materials (e.g., less than 100 molecular weight), if an ultrafiltration membrane unit is used, while preventing the passage of oil-in-water emulsion particles, as well as suspended particles in the scouring liquor.

The employment of an ultrafiltration membrane device results in the concentration of wool grease, dirt, etc., and in the generation of a nonturbid aqueous-permeate effluent. The permeate effluent is often of such quality that it may be directly disposed of by discharge into the waterways without contributing to pollution, or if desired, further membrane reverse osmosis (i.e., high pressure) processing of the permeate effluent may be employed to reduce further the suint (potassium carbonate), and low-molecular weight organics, and thereby substantially reduce the polluting aspects of the associated permeate effluent. More particularly, all or a part of the permeate may be further employed in the wool-scouring process, such as, for example, be redirected into the cold or hot wool-scouring tanks.

A typical ultrafiltration or reverse osmosis membrane consists of a thin-film membrane, such as cellulose acetate, which has been placed in or cast onto a porous support. A typical tubular configuration consists of a resin-reinforced porous braided glass-fiber support tube containing a membrane on the ID surface (high pressure side). The emulsion-scouring liquor or other feed stream is introduced into the interior of the tube which is used as a feed zone, while the permeate-effluent fraction is removed from the exterior of the tube. The concentrate fraction is removed after flowing through the tube or a series of tubes. The particular porous structure and selectivity factors of the membrane employed; that is, the pores of the ultrafiltration membrane, are typically much smaller than the emulsified oil-in-water and suspended particles, so that the pores do not become plugged during use. Such particles are of such a size that they cannot enter into the membrane structure. The ultrafiltration membrane pores are typically in the 0.1 to 0.01 micron range with the reverse osmosis membrane having pores less than 0.001 microns in size. Of course periodically as necessary and desired, the surface of the membrane; i.e., the interior of the tubular membrane surface, may be cleaned to maintain flux at the desired flux rate. Cleaning may be carried out by the use of an aqueous-detergent cleaning solution, and/or an aqueous grease-degrading enzyme solution, or the periodic introduction of a solvent for the wool grease which does not adversely affect the membrane during such cleaning.

In my process, the wool-scouring liquor is concentrated, so that the wool grease may contain up to 50 percent of wool grease, which permits the easy recovery of the valuable high and medium-quality wool grease. In my process, membrane units may be employed both in the centrifugal recovery process and the acid-cracking process, or combinations thereof, to permit substantial economic advantages and a simplified operation, as well as abatement of pollution problems. For example, by the employment of a membrane, elimination of the centrifuging or separation step in the centrifugal process is possible by concentrating the grease and dirt in the emulsion concentrate from the ultrafiltration membrane unit to such a concentration; for example, over 10 percent to as high as 60 percent, so as to allow the processing and recovery of the valuable wool grease and components by alternate methods.

Such alternate methods permit high recovery at lower capital and operating costs, and would include such methods as direct settling and flotation of the dirt and grease respectively, and/or recovering by filter operations, such as by filter-cake pressing or vacuum drum drying. Another advantage of the employment of a membrane unit is the concentration of the emulsion-scouring liquor in a centrifugal recovery process before centrifuging, so as to increase the emulsion-scouring liquor to a concentration level where the centrifuge is most efficient; for example, to concentrate the wool grease in the emulsion to a level of 5 to 20 percent, thereby permitting very efficient recovery of the wool grease in a centrifuge.

Another advantage of my process is the concentration of the acid-cracked emulsion liquor, so that the concentrate derived from an ultrafiltration membrane unit can be directed to a recovery operation, such as a filter press, thereby by-passing or obviating the requirement for a settlement and skimming tank. Further, the permeate derived from the membrane unit may be re-used in the hot and cold-scouring tanks or in other parts of the same or different operation, or if desired, disposed of directly into the waterways with or without further treatment, depending upon the nature of the effluent. In some cases, purification of the effluent-fraction streams from an ultrafiltration unit may be further processed by reverse osmosis membrane processing at high pressures from 500 to 2,000 psig in order to remove low-molecular weight organics and salts where their level is high. The resulting low or grease and salt-free effluent fraction may then be disposed of in a waterway or reused in the process or other processes.

Therefore, my process may employ both ultrafiltration and reverse osmosis units in a wool-scouring process. By my process, it is possible to eliminate the use of the centrifuge or acid-treatment steps, and the disadvantages associated with each of the processes, or to improve the efficiency of each process or a combination thereof, while further permitting the reuse of the membrane-permeate fraction in the process and abating pollution. By the employment of a membrane, acidification, in one embodiment, of the wool-scouring emulsion liquor may be avoided, so that the ester components recovered from the wool grease will not be hydrolyzed, reducing the value of the recovered wool-grease product. By the use of membranes in the acid-cracking process, the grease in the supernatant liquor, normally lagooned for biological degradation, may be concentrated to a level allowing it to be separated by centrifugation or filter-pressing, while producing a permeate fraction with a greatly reduced grease content and suitable for reuse in the cold and hot-water wash tanks or disposal in local waterways.

In another embodiment of my process, a membrane unit is employed to concentrate low-to-medium quality wool grease from a centrifuge effluent stream. In a wool-grease centrifugal recovery process, the wool grease recovered by the centrifuge, even through recovery is low in efficiency, the wool grease is of high quality; i.e., rich in lanolin, and, therefore, valuable. The aqueous centrifuge effluent stream from the first stage centrifuge contains lower value, low-quality wool grease, typically at concentrations of about 1 to 2 percent. In my process, an ultrafiltration membrane unit is employed to concentrate further the centrifuge effluent emulsion to a higher concentration; e.g., 2 to 6 fold for recovery of the low-quality wool grease in a second stage separator; i.e., a centrifuge with the centrifuge effluent recycle back to the ultrafiltration unit. My process, thus, provides for the use of a first stage and/or second membrane units to concentrate an emulsion-scouring emulsion or a centrifuge emulsion effluent to permit recovery in an effluent and economic manner of a high and a low-quality wool-grease fraction, and the abatement of pollution by reuse and recycle of the centrifuge effluent in the process.

DESCRIPTION OF THE EMBODIMENTS

Figure 1:
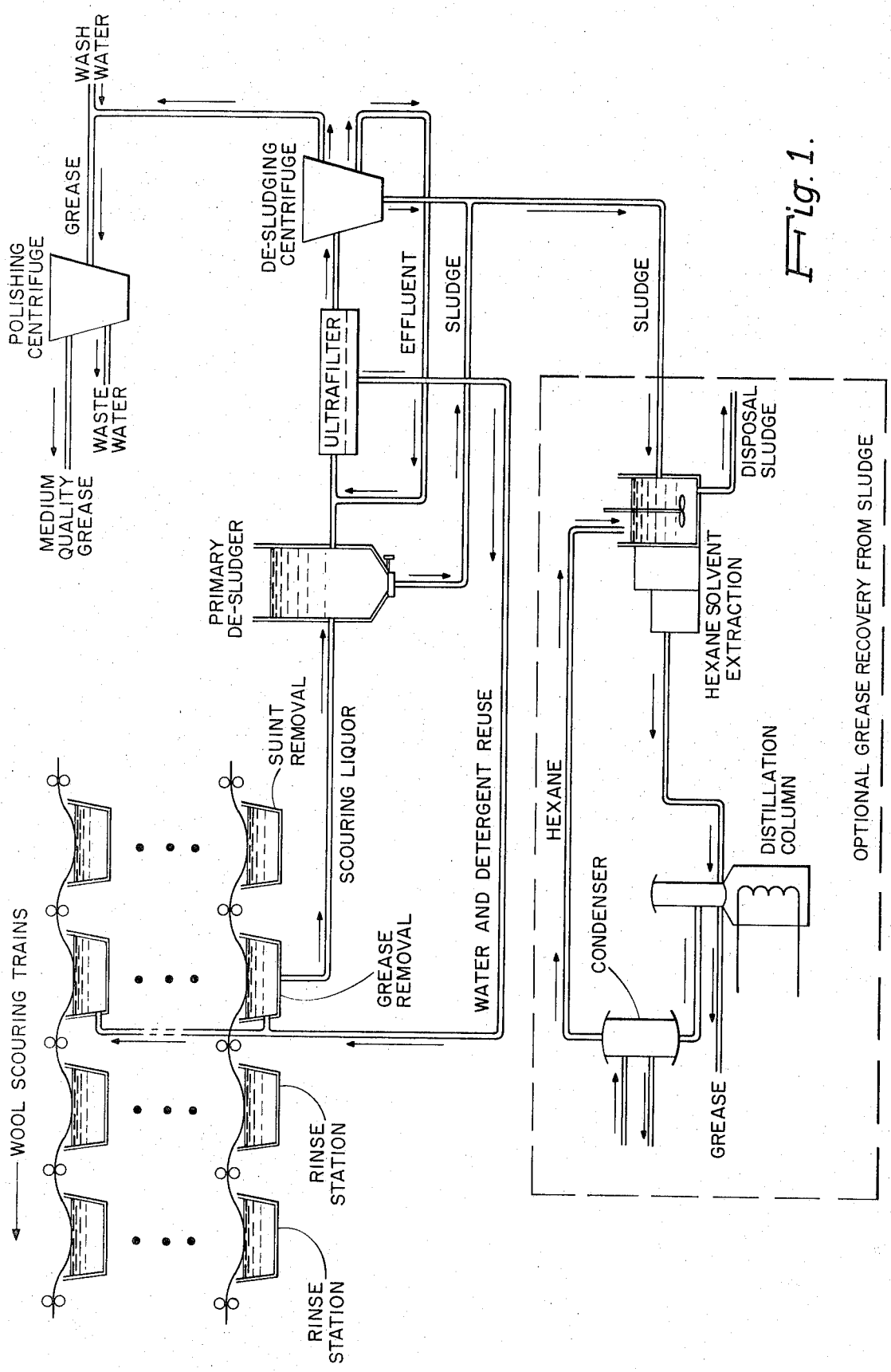
FIG. 1 is a schematic process-flow diagram illustrating a closed-loop centrifuge grease recovery process which includes ultrafiltration membrane unit to concentrate the emulsion-scouring liquor, and recover medium-quality wool grease.

FIG. 1 illustrates a process wherein a raw wool is introduced into a wool-scouring train comprising a series of cold and hot water scouring tanks. Wool from the wool-scouring tanks is then introduced into a hot-scouring tank containing a surfactant, such as a nonionic detergent, such as a polyether alcohol like an alkylphenoxypolyethoxyethanol, such as octylnonylphenoxypolyethoxyethanol, or an anionic detergent, such as a sulfonate. The clean wool is removed from the hot-scouring tank and sent through two following rinse tanks. The resulting emulsion-scouring liquor is removed from the hot-scouring tank, which liquor contains from approximately 2 to 6 percent of wool grease. The scouring liquor is introduced into a primary desludging tank where sludge is removed.

The desludged scouring liquor is then introduced into an ultrafiltration unit containing, for example, one-inch braided porous resin-reinforced fiber-glass tubes having a thin cellulose acetate membrane cast on the interior surface of the tubes, the cellulose acetate membrane adapted to prevent the passage through the membrane of the emulsion particles or suspended matter, but to permit the low-molecular weight; that is, less than about 100 molecular weight, dissolved salts and water through the membrane as an effluent-permeate fraction. The effluent-permeate fraction so removed may be disposed of or recycled. Since the effluent-permeate fraction often contains dissolved surfactants or materials useful in the wool-scouring process, the effluent fraction is shown recycled to one or both of the scouring tanks for reuse, or optionally futher treated, such as by a reverse osmosis unit, prior to reuse or discharge.

The emulsion-scouring liquor in the ultrafiltration unit is concentrated to a range of approximately 6 to 12 percent by weight grease, and the concentrate fraction then removed and sent to a centrifuge to remove sludge and provide a high grease-containing centrifuge effluent stream for concentration of the grease in a polishing centrifuge. The aqueous effluent from the desludging centrifuge is recycled back to the inlet of the ultrafiltration membrane unit. The grease may be recovered from the membrane-concentrate fraction by other means than as shown, such as by direct filtration, etc.. The concentration of the emulsion-scouring liquor stabilizes the emulsion and permits the easy removal of wool grease directly, while further, additional sludge material composed of wool grease and dirt and suspended matter which did not pass through the semipermeable membrane is removed in the desludging centrifuge, and the wool grease recovered. The grease from the polishing centrifuge may be filtered by a filter press. Also illustrated is an optional grease recovery process for the sludge which includes the steps of solvent extraction of the grease from the sludge; e.g., with hydrocarbon like hexane, the distillation of the solvent from the extraction solution to recover the dissolved grease, and the condensation of the distillate and recycle of the liquid hexane to the extraction step. If desired, the desludging and polishing centrifuges may be omitted from the process of FIG. 1, and the wool grease emulsion-concentrate fraction from the membrane unit treated, such as by acid treatment or other means, to recover the wool grease therefrom. Only one membrane unit is shown; however, a series of membrane devices may be used, with the membrane used of the same or different properties in each device.

The process of FIG. 1 illustrates the elimination of a centrifuge separation step in a typical centrifuge processing recovery operation through the concentrating of the wool grease and dirt from the emulsion-scouring liquor through the use of an ultrafiltration membrane unit. The concentration occurs at such a level that will allow direct grease recovery, such as by a settling tank, flotation of the dirt and grease, the filter cake pressing to recover wool grease, or a polishing centrifuge. The process illustrated is a closed-loop modified centrifuge process, and permits the recovery of over 95 percent of medium-quality grease.

FIG. 1 illustrates the concentration of emulsion-scouring liquors to a desired concentration level before introduction into the centrifuge, so as to maximize and optimize the centrifuge efficiency. The particular level of concentration will vary; however, typical emulsion-concentrate levels should be as high as practicable, such as over 50 percent of wool grease or solid in the emulsion, so as to reduce the volume of liquor introduced into the centrifuge. In addition, the process also illustrates the reuse of the permeate in a scouring operation, or optionally, the treatment of the permeate effluent by a reverse osmosis unit prior to discharge, as well as purification of the final effluent stream by further membrane processing.

Figure 2:
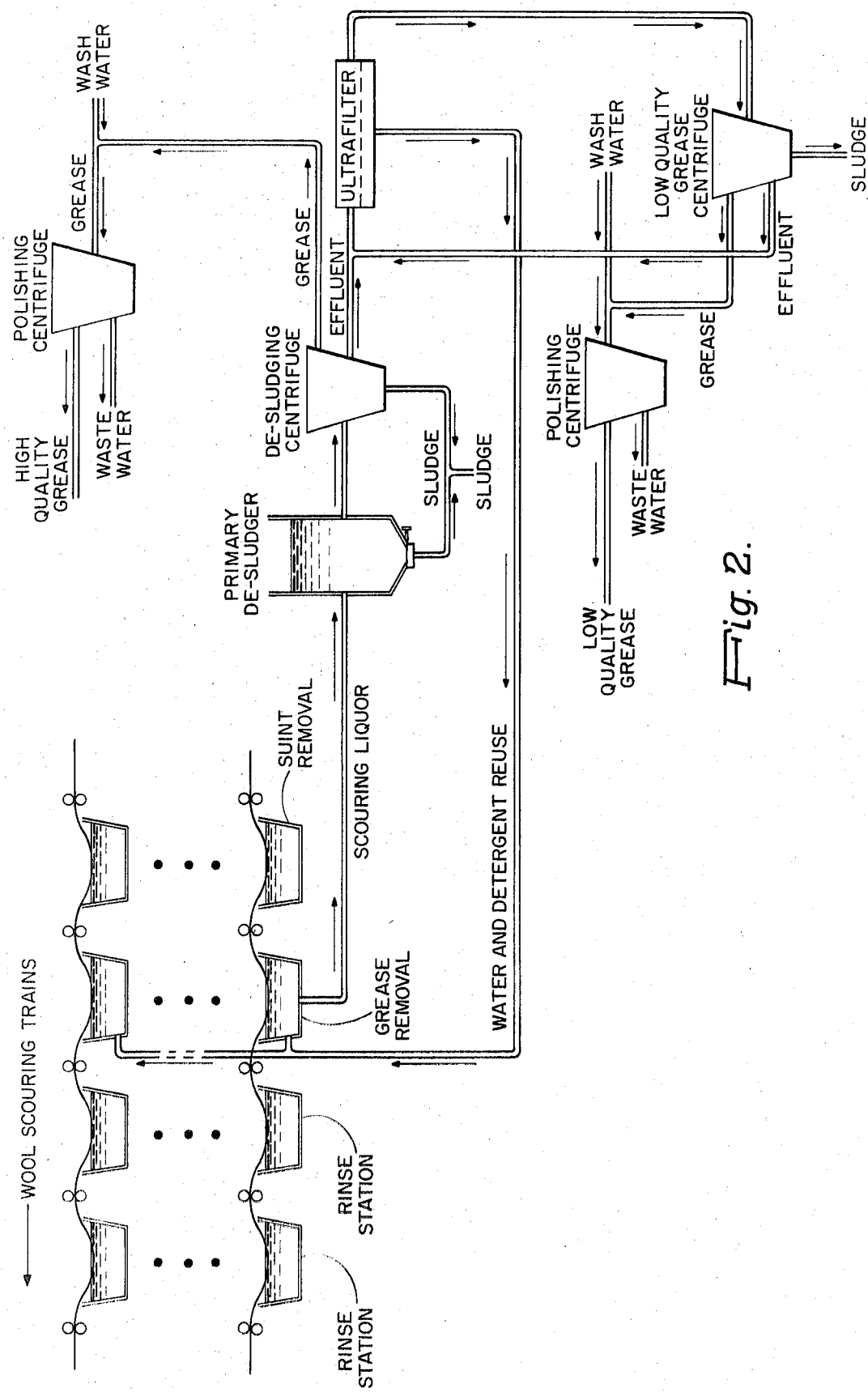
FIG. 2 is a schematic process-flow diagram illustrating a closed-loop centrifuge grease recovery process which includes an ultrafiltration membrane unit to concentrate the emulsion-scouring liquor, and to recover high and low-quality grease.

FIG. 2 is a process-flow diagram illustrating the scouring of wool in a process similar to FIG. 1, except directed to the recovery of a high-quality wool grease and a low-quality wool grease. The liquor introduced into an ultrafiltration membrane unit is received from a desludging centrifuge. An emulsion concentrate as before is obtained from the ultrafiltration unit. In this process, the emulsion-concentrate fraction is then introduced into a centrifuge, and wherein low-quality wool grease is removed from the centrifuge and recovered, such as by a filter press or solvent-extraction techniques. The high-quality grease recovered by the desludging centrifuge is recovered after washing in a polishing centrifuge. The effluent permeate from the centrifuge may then be recycled back into the ultrafiltration unit (not shown), or back to the hot-scouring tank as illustrated. The sludge removed from the centrifuge is then treated with a filter press to recover the wool grease and the valuable components thereof, or by the recovery process of FIG. 1. The effluent-permeate fraction removed from the ultrafiltration unit may be introduced into a reverse osmosis unit to remove the dissolved components or low-molecular weight solvents, and, therefore, obtaining a clean effluent-permeate fraction from the reverse osmosis unit and an acceptable level of salts for discharge into the waterways or for recycle in this or another process, or for regular water use, such as boiler-water treatment, while the concentrated salts are disposed of. The effluent from the low-quality grease centrifuge is recycled back to the inlet of the ultrafiltration device.

Figure 3:
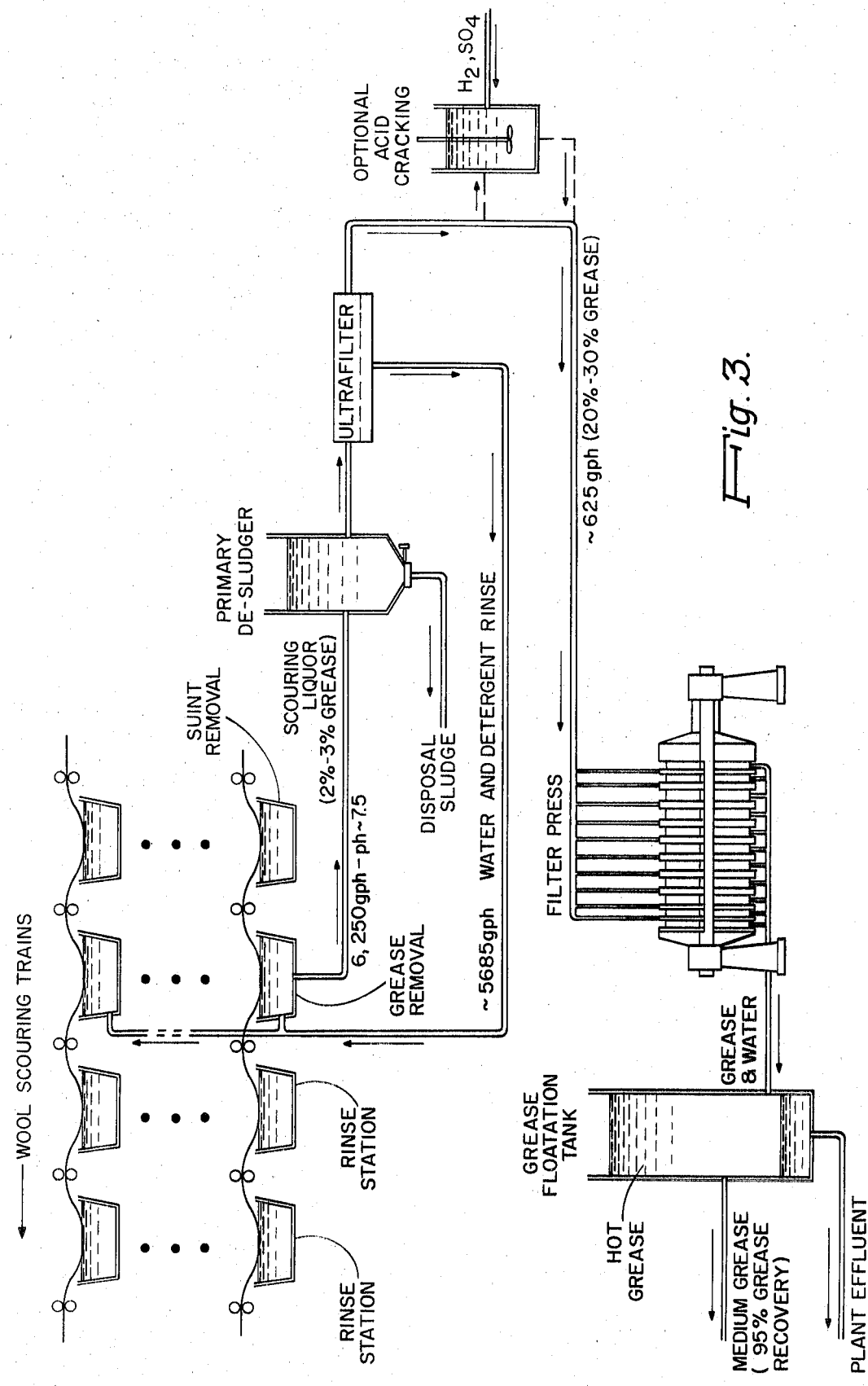
FIG. 3 is a schematic process-flow diagram illustrating the concentration of a primary desludged effluent before acid-cracking liquor by an ultrafiltration membrane unit.

FIG. 3 is a schematic process-flow diagram illustrating the use of an ultrafiltration membrane device in an acid-treating process. The concentrated wool-scouring liquor often removed from the ultrafiltration unit is treated with an acid or a strong acid salt in order to redude the pH to the acid side. A dirt-rich sludge fraction is recovered from the primary desludger tank for disposal or recovery. The acid-cracked emulsion concentrate is introduced into a filter press, and the medium-quality wool grease recovered and then further treated or upgraded. The effluent-permeate fraction removed from the ultrafiltration unit as before may be recycled, either to a reverse osmosis unit or directed to disposal. This process illustrates the employment of a membrane unit and the concentration of a wool-scouring liquor and concentration of an acid-cracked emulsion liquor, so that the concentrate can be directed to filter presses, thereby by-passing settling and skimming tanks.

EXAMPLE 1

In a series of tests to determine the efficacy of the concentration of scouring liquor centrifuge effluent, both containing a wool-grease emulsion by ultrafiltration, the liquor in the liquor effluent was treated in an ultrafiltration unit containing approximately 4.4 square feet of membrane area. An emulsion-scouring liquor was obtained from scrubbing raw wool with a nonionic surfactant solution, with the scouring liquor containing approximately 2.5 percent wool grease, the wool grease composed of alcohol and fatty acids ranging from about $C_5$-$C_{30}$, and ranging from liquids to solids at approximately 25°C. The wool grease had a content of approximately 30 percent of a lanolin mixture composed of lanosterol and cholesterol, the mixture melting between about 36° and 42°C. The raw wool so washed resulted in a 2,000-gallon per hour wash-water stream of the emulsion-scouring liquor.

The emulsion-scouring liquor was then fed directly to a continuous centrifuge yielding approximately 50 gallons per hour of wool grease, 600 gallons per hour of dirt, and 1,300 gallons per hour of scouring liquor effluent containing most of the nonionic surfactant, and about 1 to 2 percent wool grease. The centrifuge effluent liquor was then treated with approximately 3 percent of sulfuric acid, which reduced the pH level to about 3 to 3.5, resulting in breaking of the emulsion. Grease was then recovered, and the wool-grease solvent extracted. The emulsion-scouring liquor having a pH of approximately 7.2 was then concentrated in an ultrafiltration unit employing Abcor ultrafiltration membrane tubes to a concentration of approximately 7 percent wool grease. The emulsion-scouring liquor was then tested in pH by the addition of an acid to a pH of 2.10 and concentrated in an ultrafiltration unit to an emulsion concentrate of about 7 percent wool grease. Additionally, the scouring liquor centrifuge effluent was also concentrated in an ultrafiltration unit 4.4 to a wool grease concentrate of 1 ½ to 9 percent.

It was found that in the concentration of scouring liquor of Example 1, the flux was extremely temperature-sensitive between 30° and 40°C, and it is believed that this temperature sensitivity is due to the transition from the solid-to-liquid particles in the emulsion; that is, from a solid-liquid emulsion to a liquid-liquid emulsion within this temperature range. Example 1 was carried out at a temperature of approximately 40°C; that is, a liquid-liquid emulsion, so that the initial flux is approximately 100 gfd (gallon/day-square foot). During the membrane concentration and after concentration of the emulsion to about 1.6 full concentration, the flux dropped to 50 gfd. It is believed that the drop in flux was associated with the reaching of the solubility limit of some of the components in the water phase, or that the emulsion breaking occurred, resulting in increased membrane concentration polarization which would reduce the flux rate. The permeate effluent recovered in Example 1 was crystal-clear, having a dark-straw color. Acid was added to the permeate fraction, and turbidity in the permeate fraction then occurred at a pH of approximately 2.5, which was believed to be due to the acidification of low-molecular weight acids which had passed through the membrane and into the permeate fraction.

EXAMPLE 2

Example 2 was carried out employing a pH-adjusted scouring liquor, and the permeate fraction recovered was again crystal-clear, yet much lighter in color than that of the fraction of Example 1, indicating that the acidification of the scouring liquor is desirable in acidifying of the low-molecular weight dissolved components in the prior permeate fraction. The concentrate emulsion sample from Example 2 indicated a distinct liquid-oil layer, indicating that the ultrafiltration membrane unit had concentrated the emulsion-scouring liquor to a concentration level sufficient to destabilize the emulsion, resulting in an emulsion breaking.

EXAMPLE 3

In Example 3, it was found that the flux rate remained relatively constant at approximately 50 gfd with the concentration providing a 4.5 full concentration of the wool grease. It was determined that the percent solids in the effluent fraction of all examples was approximately constant at about 1 percent, indicating the complete rejection of the oil-in-water wool-grease emulsion itself, and the passage of low-molecular weight species through the emulsion, so that the overall rejection increased as the volumetric concentration in the membrane unit proceeded.

Further, as part of my process and invention, it is preferable to operate the membrane unit at a temperature sufficiently high to insure a liquid-liquid emulsion rather than a solid-liquid emulsion, typically employing a wool-grease-scouring emulsion of from about 35° to 45°C. Further, I have discovered that acidification of the emulsion prior to introduction into the ultrafiltration membrane unit is often desirable in order to reduce the acidified low-molecular weight acids and other components which may come out on the effluent permeate, and give the effluent permeate a darker color. However, acidification results in a low pH permeate, which must be partially neutralized before it can be reused for scouring purposes. An alternate scheme is illustrated in FIG. 3, or another scheme is to post-treat the dark permeate from an untreated scouring liquor by passage through a carbon adsorption column to render it lighter and suitable for scouring reuse. Typically, ultrafiltration and other membrane units should be employed, giving at least a membrane flux of 10 gfd, and preferably, one of over 30 to 50 gfd in a continuous operation, and providing for periodic detergent-cleaning of the membrane system.

My invention has been illustrated through the employment of a high-melting-point component, such as wool grease; however, my process may be employed with grease or fat-like material, and the term "wool grease" set forth is intended to include oil, tanning grease, leather grease and similar products of fatty acid, alcoholic and ester in nature, particularly those materials containing lanolin or valuable recovery by-products. Typically, such products would include materials having a specific gravity of about 0.9322 to 0.9449, and solidification points of about 38° to 40°C in the major components, and which are soluble in alcohol, ether and benzene.

I claim:

1. A process for the treatment of emulsion-scouring liquor containing a wool-grease-in-water emulsion, which process comprises in combination:
   a. introducing the emulsion-scouring liquor into a membrane unit characterized by a semipermeable membrane adapted to prevent the passage of the wool-grease-in-water emulsion and suspended material, and to permit the passage of water;
   b. introducing the emulsion-scouring liquor into an emulsion-concentrate fraction containing the wool grease and a permeate fraction essentially free of wool grease, emulsion and suspended particles, the separation of the emulsion-scouring liquor carried out at a temperature sufficient to maintain during the separation step a liquid-liquid emulsion rather than a solid-liquid emulsion of the wool grease in the aqueous emulsion-scouring liquor; and
   c. recovering the wool grease from the emulsion-concentrate fraction.

2. The process of claim 1 which includes introducing and separating the emulsion-scouring liquor in an ultrafiltration membrane unit operated at a pressure ranging from about 20 to 200 psig.

3. The process of claim 1 wherein the temperature ranges from about 36° to 45°C.

4. The process of claim 1 wherein the emulsion-scouring liquor contains from about 1 to 8 percent wool grease, and wherein an emulsion-concentrate fraction contains from about two to six times the wool-grease concentration of the emulsion-scouring liquor.

5. The process of claim 1 wherein the emulsion-concentrate fraction contains from about 6 to 12 percent wool grease, and wherein the wool grease is recovered from the concentrate fraction by introducing the emulsion concentrate into a settling tank, and, thereafter, recovering the wool grease by filtering the sludge containing the wool grease from the settling tank.

6. The process of claim 1 which includes recovering the wool-grease fraction from the emulsion-concentrate fraction by introducing the emulsion-concentrate fraction into a centrifuge, and recovering the wool grease from the centrifuge sludge.

7. The process of claim 5 which includes recycling the effluent from a centrifuge for reuse in the step of preparing the emulsion-scouring liquor introduced into the membrane unit.

8. The process of claim 1 wherein the permeate fraction from the membrane unit is introduced into a reverse osmosis membrane unit to provide a low or essentially salt-free aqueous-permeate fraction for disposal or recycle.

9. The process of claim 1 which includes adding an acid to the emulsion-scouring liquor to reduce the pH to approximately 2 to 6 prior to separating the emulsion-scouring liquor in the membrane unit.

10. The process of claim 1 which includes:
    a. introducing the centrifuge emulsion effluent into a second membrane unit;
    b. separating in the second membrane unit a second emulsion-concentrate fraction rich in low-quality wool grease, and an aqueous permeate fraction;
    c. centrifuging the second emulsion concentrate in a second centrifuge, and recovering the low-quality wool grease; and
    d. recycling a second centrifuge emulsion back into the second membrane unit.

11. The process of claim 1 which includes:
    a. introducing the emulsion-concentrate fraction into a desludging centrifuge to obtain a desludged grease stream, an aqueous-effluent stream and sludge;
    b. centrifuging the desludged grease stream and recovering the centrifuged medium-quality grease;
    c. recycling the effluent stream to the inlet of the membrane unit; and
    d. recovering the grease from the sludge.

12. The process of claim 1 which includes:
    a. introducing the emulsion-scouring liquor prior to introduction into the membrane unit into a desludging centrifuge to obtain a desludge grease stream, an effluent-emulsion stream and sludge;
    b. removing the sludge;
    c. introducing the grease stream into a polishing centrifuge to obtain a high-quality centrifuge grease;
    d. recovering the centrifuged high-quality grease;
    e. introducing the membrane-concentrate fraction into a centrifuge to obtain a low-quality grease, an effluent stream and sludge;
    f. recycling the effluent stream back to the ultrafiltration membrane unit; and
    g. recovering a low-quality grease from the centrifuge.

13. The process of claim 1 which includes:
    a. adding an acid to the emulsion-concentrate fraction to reduce the pH to a value sufficient to crack the concentrate emulsion; and
    b. recovering the wool grease from the acid-cracked emulsion concentrate.

14. The process of claim 13 which includes: centrifuging the acid-cracked emulsion to obtain an aqueous-effluent stream, and to recover the wool grease; and recycling the aqueous effluent from the centrifuge into the membrane unit.

15. The process of claim 1 wherein the semipermeable membrane has pores in the range of from about 0.1 to 0.01 microns, and wherein the temperature for which the separation of the emulsion-scouring liquor is carried out is at about 40°C or higher.

16. A process for the treatment of emulsion-scouring liquor containing a wool-grease-in-water emulsion, which process comprises:
   a. introducing the emulsion-scouring liquor containing from about 1 to 8 percent by weight of wool grease into an ultrafiltration membrane unit having a supported cellulose acetate membrane characterized by a pore size of about 0.1 to 0.01 microns, and adapted to prevent the passage of the wool-grease-in-water emulsion and suspended material and to permit the passage of water;
   b. separating the emulsion-scouring liquor into a concentrate fraction containing the wool grease and a permeate fraction essentially free of wool grease, the separation carried out at a temperature above the softening point of the wool grease, and sufficient to maintain the wool grease in a liquid-liquid, rather than a solid-liquid, emulsion during separation, and the separation carried out at a pressure of from about 20 to 200 psig.;
   c. withdrawing a wool-grease fraction containing from about two to six times the wool-grease concentration of the liquor; and
   d. centrifuging the wool-grease fraction to recover the wool grease therefrom.

* * * * *

UNITED STATES PATENT OFFICE
CERTIFICATE OF CORRECTION

Patent No. 3,847,804      Dated November 12, 1974

Inventor(s) Joseph Del Pico

It is certified that error appears in the above-identified patent and that said Letters Patent are hereby corrected as shown below:

In Claim 1, part (b), column 9, line 40, "introducing" should read --separating--.

In Claim 1, part (b), column 9, line 43, the comma should be removed between "grease" and "emulsion"

Signed and sealed this 4th day of February 1975.

(SEAL)
Attest:

McCOY M. GIBSON JR.
Attesting Officer

C. MARSHALL DANN
Commissioner of Patents